United States Patent Office 3,406,034
Patented Oct. 15, 1968

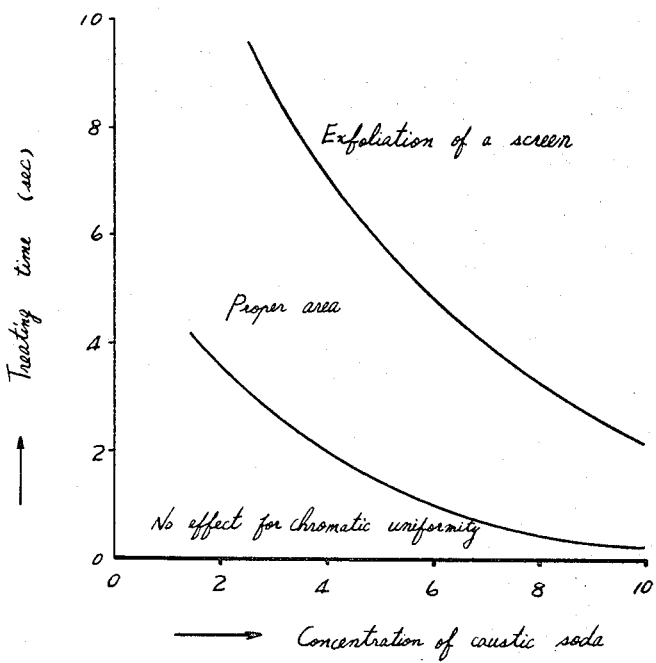

3,406,034
TREATMENT OF A PHOSPHOR SCREEN IN A CATHODE RAY TUBE
Teruhiko Komatsu and Goro Shibata, Otsu, Japan, assignors to Shinnippon Denki Kabushiki Kaisha, Osaka, Japan
Filed Jan. 25, 1965, Ser. No. 427,792
Claims priority, application Japan, Feb. 1, 1964, 39/5,163
4 Claims. (Cl. 117—33.5)

ABSTRACT OF THE DISCLOSURE

In manufacturing luminescent screens for a cathode ray tube, a dried screen of phosphor particles obtained by a sedimentation process is treated with an aqueous solution of sodium hydroxide having a concentration of 2 to 10% for a predetermined time, and immediately after such treatment the phosphor screen is rewetted with water to wash away the remaining sodium hydroxide and then a lacquer film is coated on the rewetted phosphor screen for providing a metallizing layer thereon.

---

This invention relates to a treatment of a screen in a cathode ray tube, more particularly to an improved treatment of a screen in a cathode ray tube wherein a screen laid by a known sedimentation process is, after being dried, treated with a caustic alkali solution.

The object of the present invention is to provide means for preventing chromatic non-uniformity on a phosphor screen in a cathode ray tube.

Various methods have heretofore been proposed for applying a screen to a cathode ray tube, and the most common of them is the sedimentation method, wherein there is employed a potassium silicate solution and a dilute solution of an electrolyte such as barium acetate. In this method a suspension made of an alkali silicate solution with phosphor particles dispersed therein is diffused into a dilute solution of an electrolyte such as barium acetate which has beforehand been put into a glass vessel in the shape of a cathode ray tube (described hereinafter as a bulb), and left as it is for a certain period of time for sedimentation of the phosphor particles and then, with the supernatant fluid removed by inclining the bulb, the remaining sedimented phosphor particles are dried into a screen on a prescribed area of the inner surface of the bulb.

Furthermore, the back of the screen, that is the side exposed to the electrons from the electron gun during normal use is usually lined with a metal back laid by aluminization. For this, usually the screen is first coated with a lacquer film by means of a floatation method or a spray method: in the former method, water is placed over the dried screen in the bulb and there is dropped thereon lacquer of nitrocellulose dissolved in an organic solvent which is insoluble in water, and then, when a very thin nitrocellulose film has spread all over the water surface, a smooth lacquer film remains on the screen when the bulb is inclined to remove water; in the latter method, which has developed recently, the dried screen is wetted and there is laid thereon a smooth lacquer film by means of a lacquer spray which employs a toluene solution of a material such as methacrylic acid isobutyl ester. Then the film, having been dried, is aluminized in a high vacuum by a vacuum evaporation. After this, the nitrocellulose or methacrylic acid isobutyl ester film, which has now done its work, is burned away by heating it at about 400° C. for about 30 min., and thus there is produced a screen lined with a metal back.

A cathode ray tube with a screen formed by these processes, however, has a defect of being liable to have certain chromatic non-uniformity thereon, as explained below:

When the screen is excited to luminosity by electrons, spots of various sizes from 0.1 mm. to 0.5 mm. in breadth and from 1 mm. to 10 mm. in length, brighter than or different in emission color from the rest of the screen appear thereon. These spots extend radially from the center to the circumferential parts of the screen like so many shooting stars. When the screen has visible rays passed therethrough, these spots look darker in hue than the rest. Furthermore, when the side of the screen which is to be excited by electrons is examined by removing the funnel-shaped portion of the bulb, these spots, seen at a certain angle, cast rather different reflections from the other part. The other part, seen at any angle, always gives the same diffused reflections, while the reflections of these spots are not diffused when seen from a certain angle. All these seem to be due to the difference in smoothness of the metal back at these spots from that of the rest.

According to a further test and observation, it has been found that these spots do not always or under all conditions appear on the screen laid by the sedimentation process. Their appearance depends upon the degree of dryness of the sedimented screen. When the lacquer coating is done by ordinary spraying just after the visible moisture is gone from the screen, that is, in its half-dried state, or after burning it for about 30 min. at about 300° C., for example, these spots seldom appear. But the lacquer coating on a half-dried screen is often accompanied by exfoliation of the screen in small flakes (described hereinafter as a Pin-Gel hole inferiority).

Burning the screen before the lacquer coating compels multiplication and confusion of manufacturing processes owing to the additional burning step. Therefore it is rather unsatisfactory to employ in the mass-production line, although not accompanied by such ill effects as the above-mentioned exfoliation. Further, the appearance of such chromatic non-uniformity is affected also by the compositions of the alkali silicate solution, the electrolytic barium acetate solution and the phosphor, and besides, by the relative amounts thereof.

Judging from these facts, the cause for such chromatic non-uniformity may be attributed mainly to the following phenomena. In this sedimentation process for laying a screen, silica sol produced by the reaction between an alkali silicate solution and an electrolyte binds the phosphor particles settled on the bulb face and fastens the phosphor particles to the bulb glass. After this the supernatant liquid is removed and the screen is dried in clean and dry air, whereby the silica sol gets more dehydrated and condensed and thus is forced to develop its chain or reticulate bond to strengthen the screen. In this, though the cause is not yet made clear, silica polymers or irregular silica molecules seem to grow in some parts and abnormally develop under a certain condition of the drying. When the screen is moistened with water to lay a lacquer coating on it for aluminizing the screen, the water in contact with these parts seems to differ from the rest in pH, the electric conductivity and the surface tension, for those abnormally developed silica polymers or irregular silica molecules dissolve into it.

Then, it may be considered, when a lacquer coating is laid thereon by spraying, the interfacial tension between the lacquer film on these parts and the water differs from that on the rest, which causes the difference of the spread or thickness of the lacquer film on these parts from that on the other part, and so the metal back of aluminum thereon has a different reflection and yields such variegated spots as described hereinabove.

These spots seldom appear when the screen has been given a half-drying treatment or a burning treatment at 300° C. The reason for this may be that when the screen is in a half-dried state, there is no room yet for silica polymers to have an irregular structure or to develop abnormally, and when the screen is burned at 300° C., overdeveloped or abnormally developed silica sol is all made into silicic anhydride monomers or polymers.

In order to prevent these spots being produced, the present invention provides a method wherein a screen, which is laid on a prescribed area of the inner surface of the bulb of a cathode ray tube by a sedimentation process employing phosphor particles, an alkali silicate solution and an electrolytic solution, is, after it has been dried, moistened all over with a caustic alkali solution as soon as possible, then is kept as it is for a certain time, and after that, the remaining alkali thereon is washed away with water to permit application of a lacquer coating thereon by an ordinary spray method.

For this alkali, sodium hydroxide (NaOH) seems to be the best, and potassium hydroxide (KOH) is rather unfit, because it is liable to cause a Pin-Gel hole inferiority on the screen afterwards in the course of lacquer spraying, although it is effective for preventing the chromatic non-uniformity. Sodium carbonate has been found by our examination to have no great effect for preventing the chromatic non-uniformity. As for KOH, it may be considered that it acts too strongly upon a silicic acid group, which serves as a bonding agent for the phosphor particles forming a screen on the bulb that it is difficult to control the conditions for proper effects, and so it is not so fit as NaOH.

This NaOH treatment is the most effective when done at room temperature, the concentration being from 5 to 10%, and for about 2 secs. If the conditions are below these standards, the prevention of chromatic non-uniformity is not perfect and if they are over these standards, the subsequent lacquer spray usually finds a Pin-Gel hole inferiority on the screen. When the case is worse, general exfoliation thereof is inevitable, naturally lowering the productive efficiency.

As for the method of moistening the screen with caustic alkali, it is desirable that the solution should wet the film all over in 2 secs., giving as little shock as possible to the screen and with least unevenness in treatment. Immediately after this, alkali on the screen should be washed away. In this washing, it is most important to determine the proper timing of the operation after the alkali treatment, and if it is not done properly, the adherence of the screen to the bulb glass is weakened to cause a Pin-Gel hole inferiority on the screen or even general exfoliation of it in the subsequent lacquer spraying, though the chromatic non-uniformity can be prevented.

In one way of washing alkali, a bulb is placed face-up and a water nozzle extends into the bulb and water is pumped out of the nozzle onto the screen constantly at the flux of 50 cc./sec., until the pH of the water coming out of the bulb is below 11. The washing enables the rewetting process to be omitted, which is indispensable in the usual lacquer spraying. As a rule, the conditions for the treatment such as with caustic alkali, the concentration of its solution, the length of the treating time, the temperature and the flow of water should be determined according to the degree of the appearance of chromatic non-uniformity and the state of damage done to the screen by the treatment, and nothing like the best conditions effective in all cases can be fixed. As for other causes for the chromatic non-uniformity than those referred to above, it may naturally be considered that such impurities as oil and fat stuck to the screen would cause a different spread of lacquer sprayed thereon because of the different interfacial tension therebetween, but cleansing with an organic solvent such as ethyl alcohol, benzene or ester acetate has been found to be of no effect.

The following general example illustrates a treatment which may be carried out in accordance with the invention.

Into a bulb of a cathode ray tube of the 14" and 90° type filled with 5 liters of a barium acetate solution of 14% concentration is added a suspension made of 2.5 g. phosphor of zinc cadmium sulfide:silver, 500 cc. of potassium silicate solution of 1.10 specific gravity and 150 cc. of pure water. After keeping this still for 20 min., the supernatant liquid is removed leaving phosphor particles sedimented on the bulb face.

Then the screen is dried in an air having a low dew point and high in purity. After this the dried screen is given a caustic alkali treatment according to the present invention: that is, it is treated evenly all over with a NaOH solution at 20° C. and 10% concentration for 2 secs. Immediately after this, the screen is washed with pure water at the flux of 50 cc./sec. for 40 secs., and then is given an ordinary kind of lacquer spray.

The accompanying drawing is a graph showing the treating conditions according to the present invention.

As for other conditions in this NaOH treatment than those given in the example above, experiments on various concentrations of the solution 1, 2.5, 5, 7.5, 10, 15%, at 20° C. and at the flux of 50 cc./sec., with respect to the length of the treating time 2, 5, 10, 20 secs. respectively find the correlation between the effects against the chromatic non-uniformity and the appearance of a Pin-Gel hole inferiority in the rewetting lacquer spray through overtreatment, and the concentration and the length of the treating time, as shown on the accompanying graph, and thereby prove the scope of the treating conditions.

According to the present invention, the chromatic non-uniformity which has heretofore occurred within the range of a few percent to 50%, though the range varies a little as the seasons change, can be prevented almost completely.

It is thought that the invention and its advantages will be understood from the foregoing description and it is apparent that various changes may be made in the formulation, composition and arrangement of the details without departing from the spirit and scope of the invention or sacrificing its material advantages, the method hereinbefore described and illustrated in the example being merely a preferred embodiment thereof.

Having thus described our invention, what we claim and desire to secure by Letters Patent of the United States is:

1. In the manufacture of a cathode ray tube, the steps including sedimenting a phosphor screen from a sedimenting solution containing an alkali silicate, an electrolytic material and phosphor particles onto the screen-forming surface of the cathode ray tube, removing the supernatant fluid of the sedimenting solution, drying the sedimented phosphor screen, treating the dried phosphor screen with an aqueous solution of sodium hydroxide having a concentration of from 5 to 10% for a period of from 2 to 10 seconds and at room temperature and the effect for chromatic uniformity lies in the proper area of the graph, rewetting said phosphor screen with water to wash away said sodium hydroxide immediately after said treating step until the pH of the washing water is below 11 and to provide a smooth surface on said phosphor screen, and while the said smooth surface is wet applying a lacquer film forming material in a volatile solvent to said smooth surface for providing a metallizing layer thereon.

2. In the manufacture of a cathode ray tube, the steps including sedimenting a phosphor screen from a sedimenting solution containing an alkali silicate, an electrolytic material and phosphor particles onto the screen-forming surface of the cathode ray tube, removing the supernatant fluid of the sedimenting solution, drying the sedimented phosphor screen in air, treating the dried phosphor screen with an aqueous solution of sodium hydroxide having a concentration of from 5 to 10% for a period of from 2 to 10 seconds and at room temperature so that it is wetted all over and the effect for chromatic uniformity lies in the proper area of the graph, rewetting said phosphor screen with pure water to wash away the remaining sodium hydroxide immediately after said treating step until the pH of the washing water is below 11 and to provide a smooth surface on said phosphor screen, and while the said smooth surface is wet, spraying a lacquer film forming material in a volatile solvent onto said smooth surface, and applying an aluminum coating to said smooth lacquer film.

3. In the manufacture of a cathode ray tube, the steps including sedimenting a phosphor screen from a sedimenting solution containing an alkali silicate, an electrolytic material and phosphor particles onto the screen-forming surface of the cathode ray tube, removing the supernatant fluid of the sedimenting solution, drying the sedimented phosphor screen in air, treating the dried phosphor screen with an aqueous solution of sodium hydroxide having a concentration of from 5 to 10% for a period of about 2 to 10 seconds at room temperature so that it is wetted all over and the effect for chromatic uniformity lies in the proper area of the graph, rewetting said phosphor screen with pure water to wash away the remaining sodium hydroxide immediately after said treating step until the pH of the washing water is below 11 and to provide a smooth surface on said phosphor screen, and while the said smooth surface is wet, spraying a lacquer film forming material in a volatile solvent onto said smooth surface, hardening said lacquer film to provide a smooth plane surface over said screen, and applying an aluminum coating to said smooth plane film.

4. In the manufacture of a cathode ray tube, the steps including sedimenting a phosphor screen from a sedimenting solution containing an alkali silicate, an electrolytic material and phosphor particles onto the screen-forming surface of the cathode ray tube, removing the supernatant fluid of the sedimenting solution, drying the sedimented phosphor screen in air having a low dew point, treating the dried phosphor screen with an aqueous solution of sodium hydroxide having a concentration of from 5 to 10% for the period of about 2 to 10 seconds at room temperature so that it is wetted all over and the effect for chromatic uniformity lies in the proper area of the graph, rewetting said wetted phosphor screen with pure water to wash away the remaining sodium hydroxide immediately after said treating step until the pH of the washing water after it contacts said screen is below 11, and to provide a smooth surface on said phosphor screen, and while the smooth surface is wet, spraying a lacquer film forming material in a volatile solvent onto said smooth surface, hardening said lacquer film to provide a smooth plane surface on said screen, and applying an aluminum coating to said smooth plane film.

References Cited

UNITED STATES PATENTS

| | | | |
|---|---|---|---|
| 2,817,599 | 12/1957 | Edwards et al. | 117—33.5 |
| 3,054,672 | 9/1962 | Angelucci | 96—36.1 |
| 2,840,488 | 6/1958 | Watson | 117—33.5 |
| 2,873,205 | 2/1959 | Dijkstra et al. | 117—33.5 |
| 3,017,288 | 1/1962 | Windsor | 117—33.5 |

ALFRED L. LEAVITT, *Primary Examiner.*

R. BROWDY, *Assistant Examiner.*